(12) United States Patent
Hughes

(10) Patent No.: US 7,773,085 B2
(45) Date of Patent: Aug. 10, 2010

(54) FLEXIBLE LANDSCAPE DISPLAY SYSTEM FOR INFORMATION DISPLAY AND CONTROL

(75) Inventor: David William Hughes, Oxon (GB)

(73) Assignee: Graphics Properties Holdings, Inc., Palo Alto, CA (US)

( * ) Notice: Subject to any disclaimer, the term of this patent is extended or adjusted under 35 U.S.C. 154(b) by 664 days.

(21) Appl. No.: 11/368,452

(22) Filed: Mar. 7, 2006

(65) Prior Publication Data

US 2007/0211053 A1  Sep. 13, 2007

(51) Int. Cl.
G06T 15/00 (2006.01)

(52) U.S. Cl. .................. 345/419; 345/420; 345/427; 345/581; 345/568; 345/501; 382/285; 382/297; 715/209; 715/764

(58) Field of Classification Search .............. 345/419, 345/427, 501, 568, 10, 581, 420; 382/297, 382/285; 715/209, 764
See application file for complete search history.

(56) References Cited

U.S. PATENT DOCUMENTS

| | | | |
|---|---|---|---|
| 4,807,158 A * | 2/1989 | Blanton et al. ............. | 345/581 |
| 5,491,813 A | 2/1996 | Bondy et al. | |
| 5,528,735 A | 6/1996 | Strasnick et al. | |
| 5,682,326 A | 10/1997 | Klingler et al. | |
| 5,774,720 A | 6/1998 | Borgendale et al. | |
| 5,889,951 A | 3/1999 | Lombardi | |
| 6,137,499 A | 10/2000 | Tesler | |
| 6,480,194 B1 | 11/2002 | Sang'udi et al. | |
| 6,774,919 B2 | 8/2004 | Miller et al. | |
| 7,250,945 B1 * | 7/2007 | Scaman et al. ............. | 345/420 |
| 7,358,929 B2 * | 4/2008 | Mueller et al. ............. | 345/1.3 |
| 7,376,284 B2 * | 5/2008 | Tao et al. .................. | 382/285 |
| 2004/0212589 A1 | 10/2004 | Hall et al. | |
| 2005/0041736 A1 | 2/2005 | Butler-Smith et al. | |
| 2005/0086612 A1 | 4/2005 | Gettman et al. | |
| 2005/0149251 A1 | 7/2005 | Donath et al. | |
| 2005/0281276 A1 | 12/2005 | West et al. | |
| 2006/0174209 A1 * | 8/2006 | Barros ..................... | 715/764 |

OTHER PUBLICATIONS

PCT International Search Report, mailed Mar. 5, 2008 and issued in related International Patent Application No. PCT/US 07/05715.

PCT International Search Report, mailed Mar. 6, 2008 and issued in related International Patent Application No. PCT/US 07/05717.

(Continued)

*Primary Examiner*—Kimbinh T Nguyen
(74) *Attorney, Agent, or Firm*—Sterne, Kessler, Goldstein & Fox PLLC

(57) ABSTRACT

The present invention is a system that grids original data, maps the data at the grid locations to height values at corresponding landscape image pixel locations and renders the landscape pixels into a three-dimensional (3D) landscape image. The landscape pixels can have arbitrary shapes and can be augmented with additional 3D information from the original data, such as an offset providing additional information, or generated from processing of the original data, such as to alert when a threshold is exceeded, or added for other purposes such as to point out a feature. The pixels can also convey additional information from the original data using other pixel characteristics such as texture, color, transparency, etc.

13 Claims, 12 Drawing Sheets

OTHER PUBLICATIONS

PCT International Search Report, mailed May 8, 2008 and issued in related International Patent Application No. PCT/US 07/05716.

U.S. Appl. No. 11/368,451, filed Mar. 7, 2006, David W. Hughes, Silicon Graphics, Inc.

U.S. Appl. No. 11/368,625, filed Mar. 7, 2006, David W. Hughes, Silicon Graphics, Inc.

International Preliminary Report on Patentability, mailed Sep. 18, 2008 and issued in corresponding International Patent Application No. PCT/US2007/005717.

International Preliminary Report on Patentability, mailed Sep. 18, 2008 and issued in corresponding International Patent Application No. PCT/2007/005715.

International Preliminary Report on Patentability, mailed Sep. 18, 2008 and issued in corresponding International Patent Application No. PCT/US2007/005716.

* cited by examiner

FLEXIBLE LANDSCAPE DISPLAY SYSTEM FOR INFORMATION DISPLAY AND CONTROL

CROSS-REFERENCE TO RELATED APPLICATION(S)

This application is related to U.S. application entitled Media Fusion Remote Access System having Ser. No. 11/368,625, by Hughes, filed Mar. 7, 2006 and to U.S. application entitled Integration Of Graphical Application Content Into The Graphical Scene Of Another Application having Ser. No. 11/368,451, by Feth et al, filed Mar. 7, 2006, both of which are incorporated by reference herein.

BACKGROUND OF THE INVENTION

1. Field of the Invention

The present invention is directed to a system that displays data in a multidimensional format allowing subtle and complex information of the data to be more easily appreciated and, more particularly, to a system that displays two-dimensional (2D) as a three-dimensional landscape.

2. Description of the Related Art

A problem associated with working in virtual environments is that the desktop is very constrained and limited. As information environments become more data rich and fast moving a method is needed to enable subtle complex information to be conveyed to the user in an intuitive way.

Because of the attempt to develop a collaborative visualization architecture for accelerated workflow and enhanced decision making, there is also a need to provide a backdrop for portrayal of supporting information as well a flexible infrastructure for organizing information in a logical manner and a means of input and integration of such information.

SUMMARY OF THE INVENTION

It is an aspect of the embodiments discussed herein to provide a system that gives a user an improved view of complex data.

It is another aspect to the embodiments to present 2D data as a 3D landscape image.

It is also an aspect to provide a capability of augmenting a landscape image with additional information visually.

The above aspects can be attained by a system that grids original data, maps the data at the grid locations to height values at corresponding landscape image pixel locations and renders the landscape pixels into a three-dimensional (3D) landscape image. The landscape pixels can be augmented with additional 3D information from the original data, such as an offset providing additional information, or generated from processing of the original data, such as to alert when a threshold is exceeded, or added for other purposes such as to point out a feature. The landscape pixels can also be augmented with color, texture, icon and transparency information to convey additional information.

These together with other aspects and advantages which will be subsequently apparent, reside in the details of construction and operation as more fully hereinafter described and claimed, reference being had to the accompanying drawings forming a part hereof, wherein like numerals refer to like parts throughout.

DETAILED DESCRIPTION OF THE PREFERRED EMBODIMENTS

The embodiments of the present invention comprise a flexible landscape system designed to provide an information rich backdrop for intuitive working within virtual environments. Important functions that it performs include as an information display, as a user interface for interaction and as a framework for information organization. It does this in a static and dynamic manner. This is based upon a scene that is broken into discrete elements that can modify in real time. The elements build up a complete picture in three-dimensions (3D) that can be used to convey information, provide a flexible workspace and also a workspace interface. The dynamic nature is used to convey changing data and provide maximum flexibility to the user.

The embodiments provide a flexible structure of a workspace into which other information is organized. The system, and thus the information that is presents, can be quickly embedded and communicated through a totally programmable landscape.

The system is achieved by breaking the display landscape up into programmable elements, for example, cubes, extruded triangles or some other shape, arranged in a grid, which can be dynamically modified by vertically sliding the elements in relation a starting datum. Thus, it is like a 3 dimensional pixel grid. This can then be used to model a specific landscape structure or to embed symbols and other visual cues. Thus, the landscape represents a sort of 3D image in relief. Aspects of the elements can be varied, such as height, color, texture, translucency, etc. By doing this information can be embedded into the background scene in 3D, which are derived from input data feeds. Information can be conveyed to the user with a totally generic framework. For example, an image or video stream may be the input and the pixel color values in that stream are used to create a vertical relief, perhaps with color, that can be used to represent that information in a new way.

Figure 1:
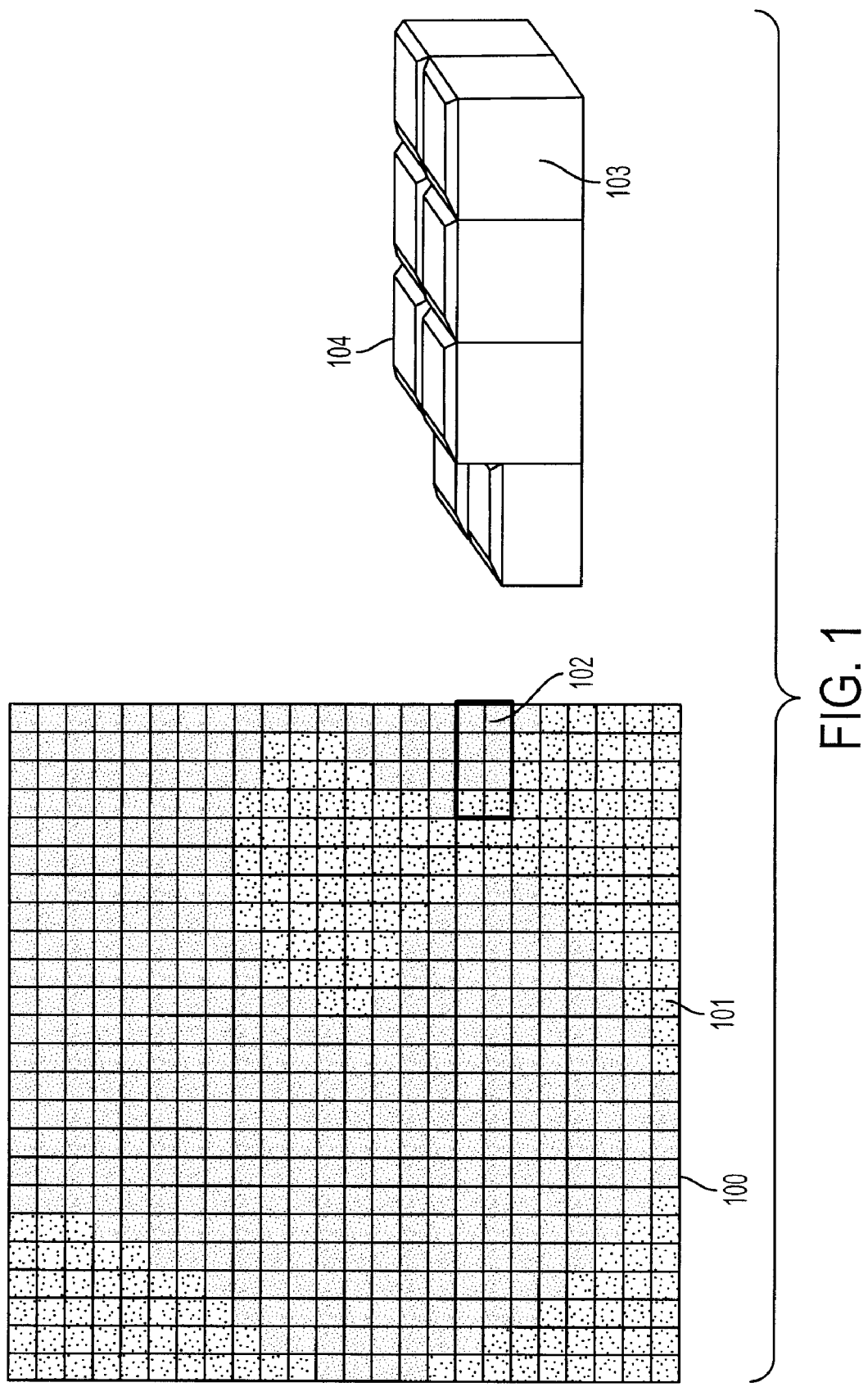
FIG. 1 illustrates a part of gridded image converted in to a part of a 3D landscape.

As noted above, the embodiments herein describe how a set of data, typically presented as flat data, such as an image where information is presented in the image using the brightness of the image pixels or the values in the cells of a spreadsheet, can be represented as a flexible landscape for information display within a 3D virtual environment. FIG. 1 shows how a set of information is broken up into discrete elements 101 each of which can be represented by a vertical column of arbitrary shape and design 103 or 104. The elements can have an overall shape, such as the rectilinear column shape shown and can be augmented with other shape information, such as the edge bevel shown. Various parameters can be represented visually where in this example the height of each column represents the value. For example, the map region shown in 100 can be represented in relief by mapping column heights to elevation values. The discrete elements are typically image pixels but can be groupings of pixels, sub-pixels or even entire image elements, such as a border or object. Elements may also be a data part of an image pixel, for example the blue component only.

Figure 2:
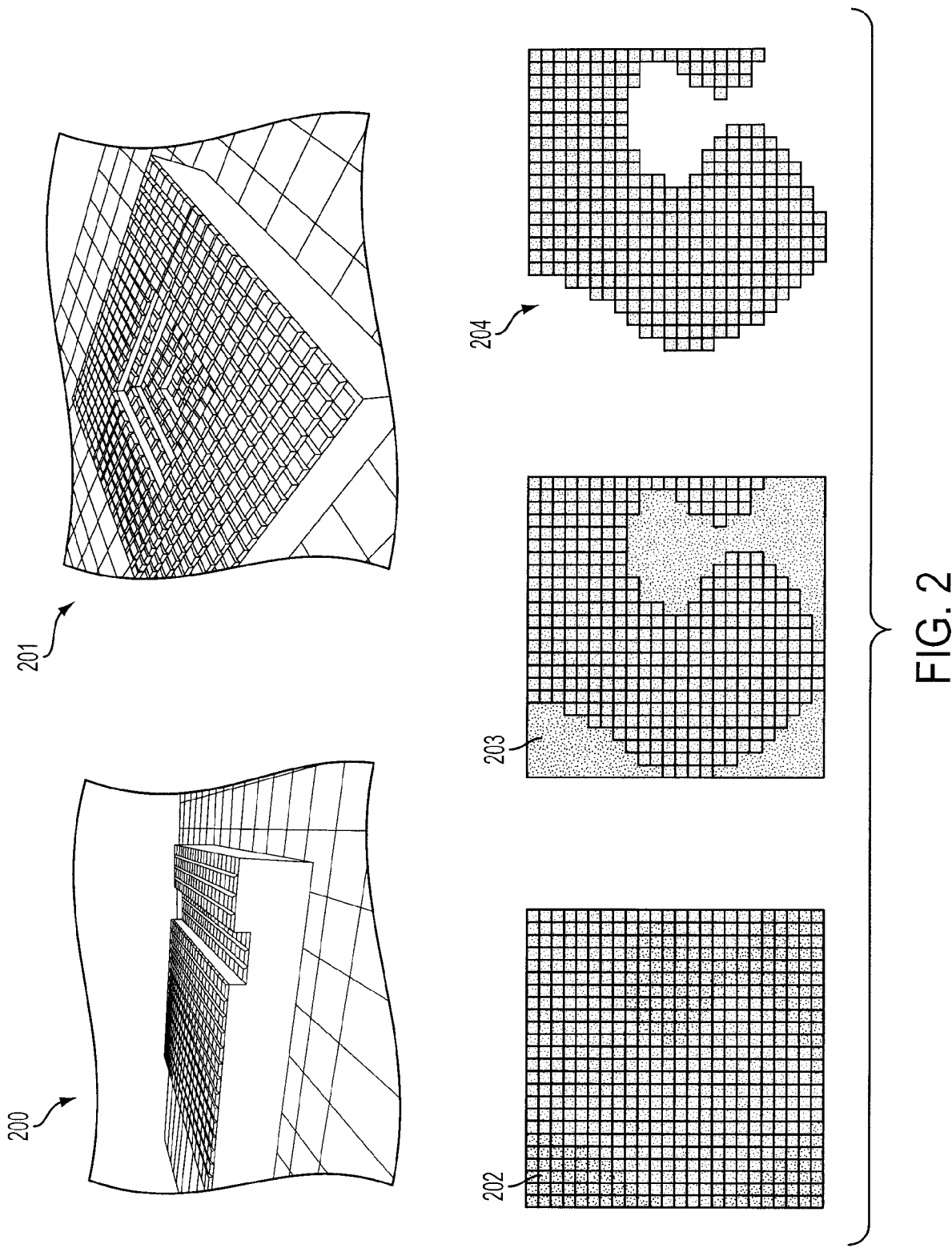
FIG. 2 shows landscape variations.

By representing data in the manner discussed herein it is possible to set up a flexible landscape environment using image input to build workspace areas for organizing information or setting up areas in which to work. In FIG. 2 display images 200 and 201 show two different types of structure. Image 200 depicts a single level of dimensionality in the object to, for example, emphasize a border between regions of data. Image 201 shows multiple levels or values within the data to, for example, show changes in the values of the data.

Also filtering can be applied to extract regions from an image 202, such as in region 203, where for example this region 203 may be at sea level and this is either shown as a single surface 203 or removed altogether 204. Thus, an image of a map could be very quickly used to show terrain elevation and the surrounding sea area.

Figure 3:
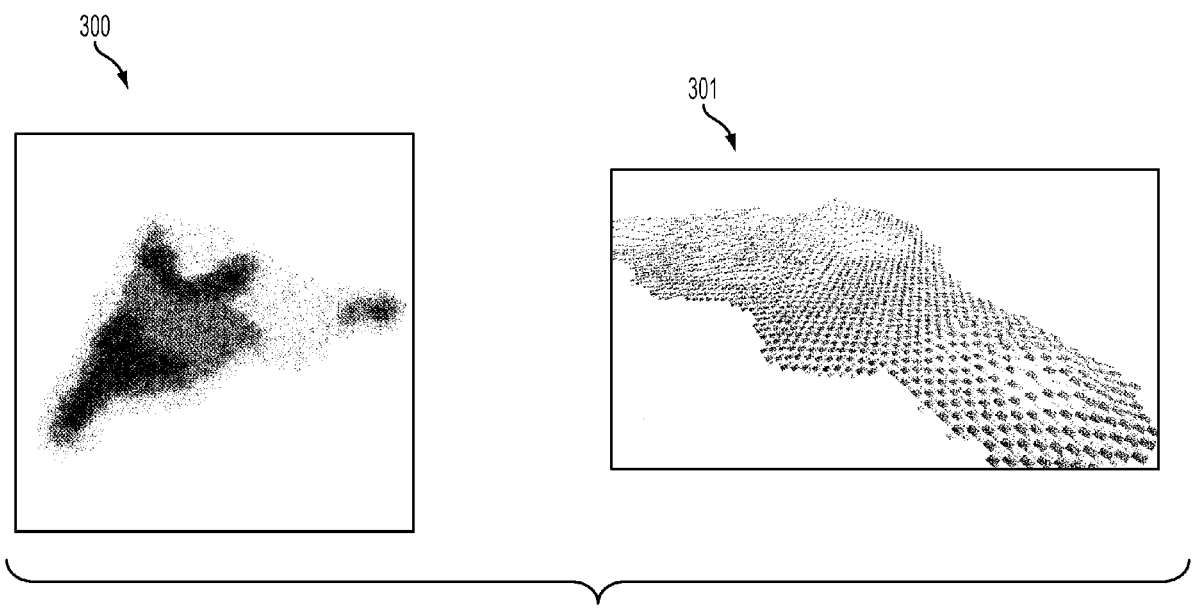
FIG. 3 illustrates a brightness map converted into a 3D landscape.

FIG. 3 shows an example of a terrain map 300 in which height is originally represented as a brightness value. This terrain map image is subdivided (gridded). In mapping the brightness values at grid locations to a height representation the system generates a 3D landscape or terrain 301 using the flexible landscape method. The embodiments allow a dynamic and a changing image or video sequence to be automatically be represented as a dynamically changing scene. In this case brightness is used to map to height, but it could be any parameter in the source data.

Figure 4:
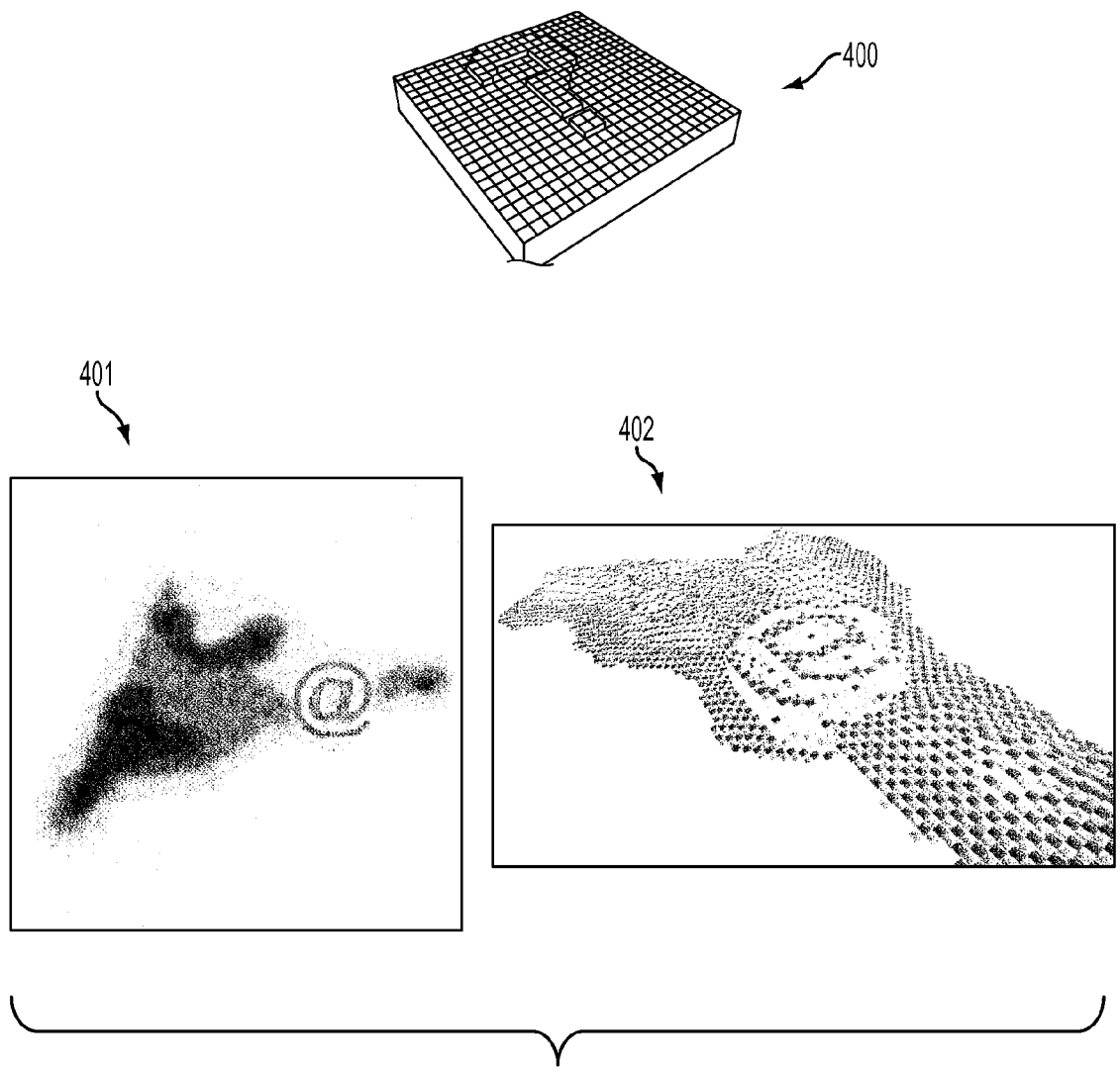
FIG. 4 shows augmenting of the landscape with an embossment.

FIG. 4 shows how additional information can be embossed onto the landscape to convey information to the user. Image 400 illustrates an embossed "?". This embossing technique can be used to augment the height mapping from the original image and provide additional information to augment the data already being viewed. Image 401 shows an embossed @ symbol embedded into the image and represented in the flexible landscape 402. Such embossing, for example, could be used to alert a user to a particular condition or event and embed this alert into the existing working space. In creating such an embossed image, data values for the embossed region augment or replace original image values and then the transformation into the flexible landscape image is performed. The embossing can substitute height data for the original data, add/subtract height to the existing data, or otherwise vary the data at the embossing site in some way.

Figure 5:
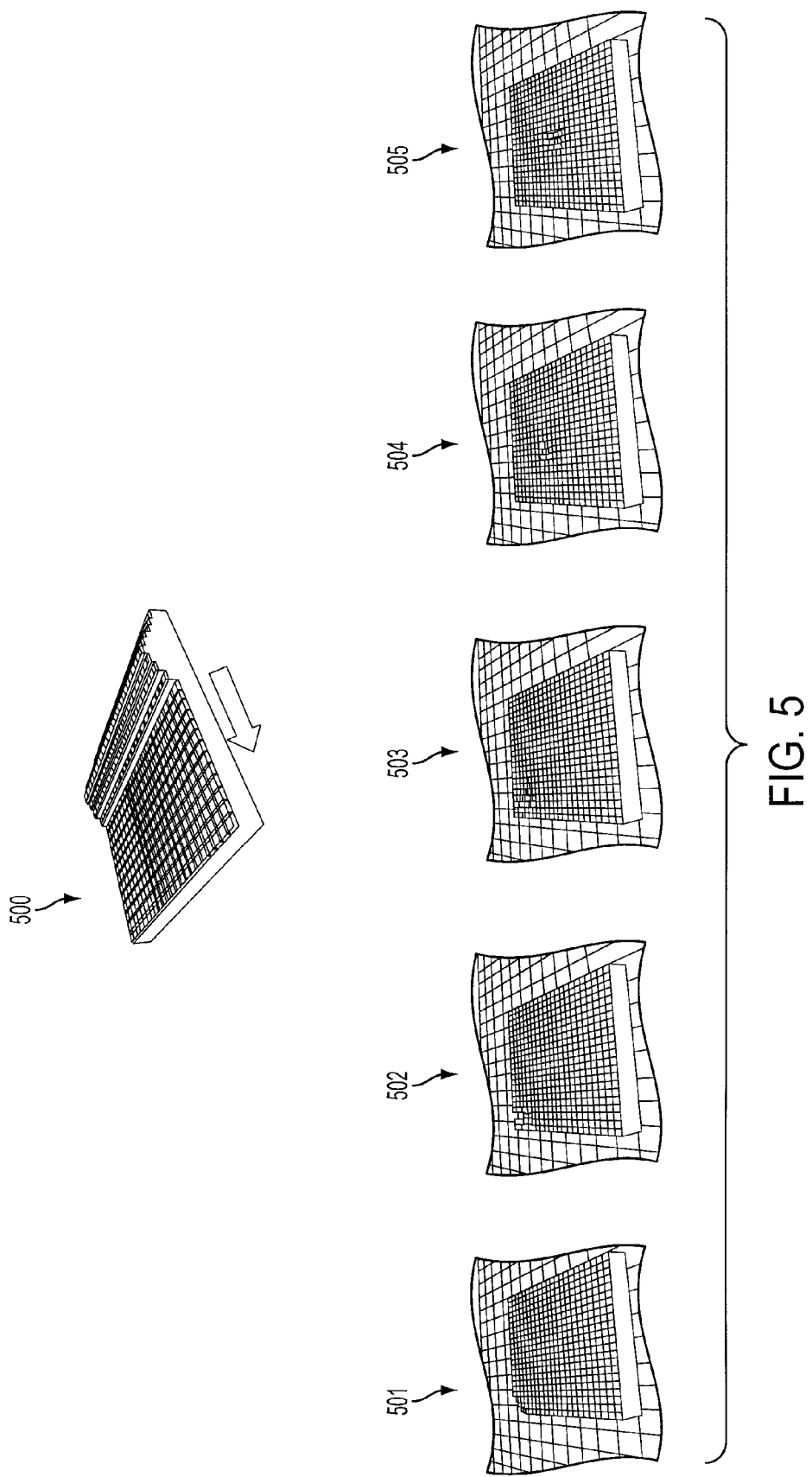
FIG. 5 shows animating a 3D landscape.

The embossed elements, like the image elements, can be dynamic. FIG. 5 shows how a dynamic element, shown in image 500 as a tsunami type wave structure, modifies and moves through the existing workspace to signify an event or alert to bring the attention to the user. Here it could actually represent the onset of a tsunami in a particular region. The importance of this is that it augments the existing display, by using the same basic representative method. Image sequence 501 to 505 shows a different type of modifier, which is like a sprite or depression that modifies the scene and moves through to signify another type of event, such as a tornado.

Figure 6:
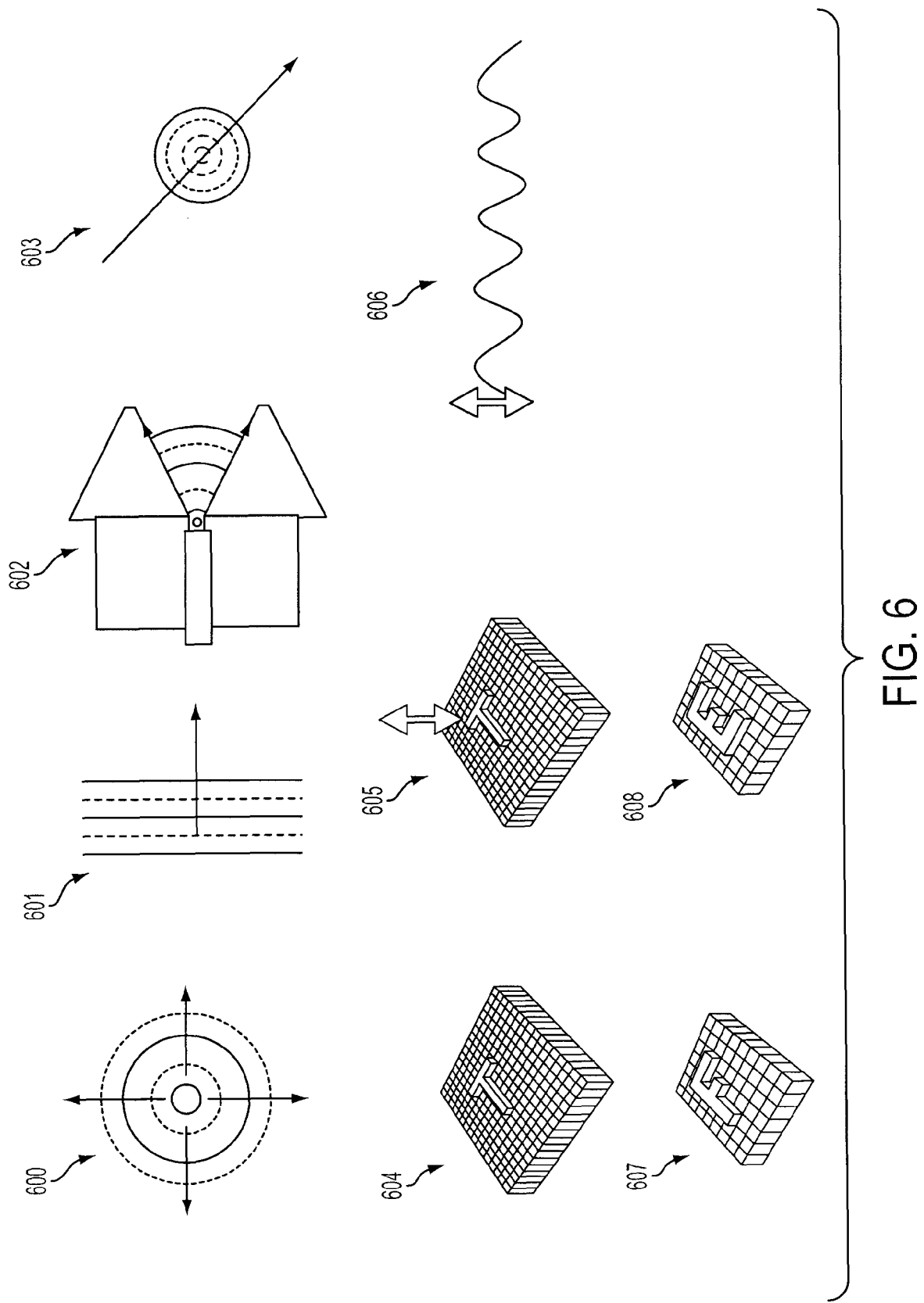
FIG. 6 shows other variations of landscape modification.
Figure 7:
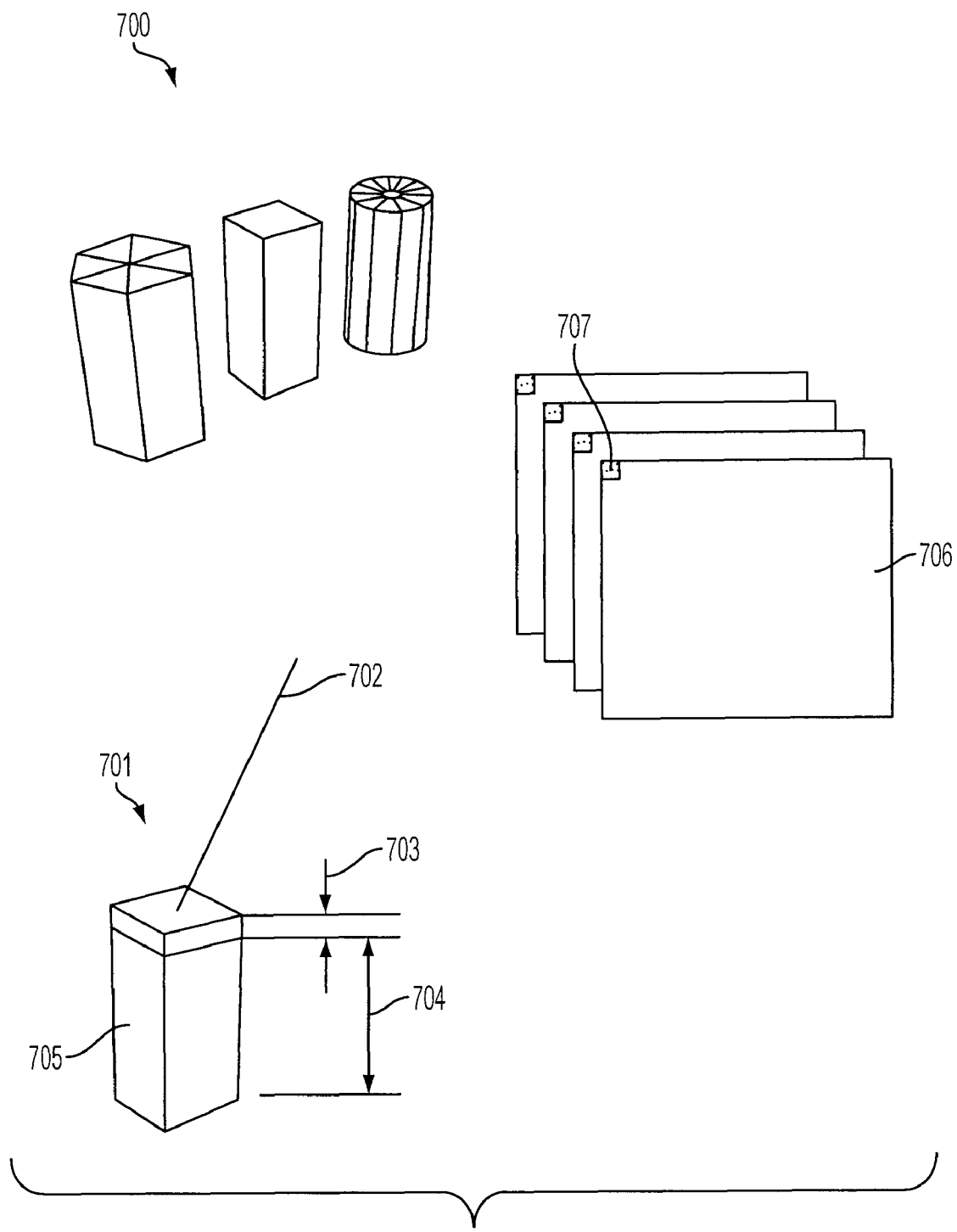
FIG. 7 shows landscape pixel variations.

FIG. 6 illustrates additional ways that the system can be used. Images 600 to 603 inclusive show some suggested methods of how this technique could be applied, where a certain shaped disturbance in the flexible landscape can then augment and represent some significant information to the user. The solid and dashed lines represent boundaries of image regions with different image values that can be depicted as levels as in FIG. 1. Image 600 shows an epicenter of an earthquake metaphor sending ripples out from a specific location. Image 601 shows a tsunami style metaphor. Image 602 is similar to 600 but is constrained to a particular angular range. Image 603 shows a sprite type formation travelling through the surface of the existing landscape. Image 604 shows an embossed symbol in an existing landscape while the arrow in image 605 shows how that this symbol can be moved and animated by cyclically varying the height according to a wave function 606. Images 607 and 608 show how a symbol can be animated in form to morph between two or more different symbols thus conveying information in an additional manner.

The column shapes described previously, such as with respect to FIG. 1, have been rectilinear, but this is not constrained by the method and could be circular, hexagonal or any cross sectional shape, even irregular, that can be extruded in height, such as the examples shown in image 700. Image 701 shows how different types of information apart from overall height (704) can also be shown on the column. Reference number 703 indicates a vertical modifier that might be used with a dynamic or static modifier. Reference number 702 represents the top surface that can use color, texture, transparency or shaders to impart additional information. These parameters can also be applied to the sides 705 or the whole object. An image or a 3D object might also be used to modify the top surface and convey additional information.

A source image that may be made up of source pixels each of which has a depth of data, for example red (706), green, blue and alpha, all of which would have a number of bits associated with them. A single pixel is shown represented as 707. As the image drives the column appearance in the flexible landscape view, different aspects of the source image are mapped to the representation of the column. For example, red might drive height, green a height modifier, blue texture type for the top surface 702 and alpha determines transparency. With the invention, a more complex image can be produced that creates a richer visual display and conveys additional information to the user. Source images can be combined together and also animated to convey additional information to the user via this method.

Figure 8:
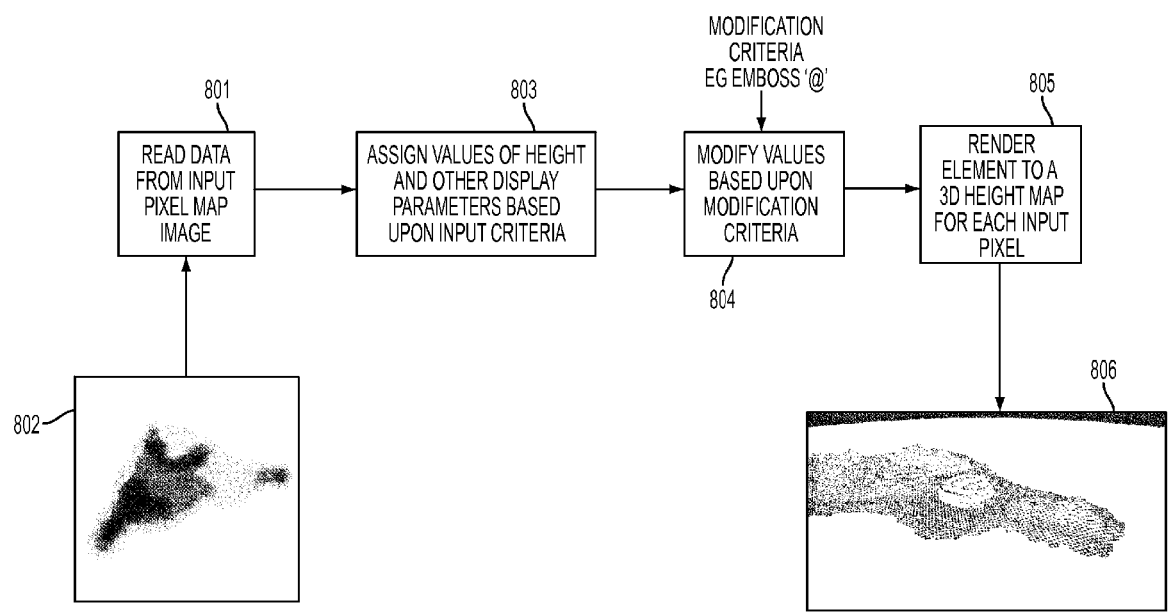
FIG. 8 illustrates operations of the system.

The operations performed by the system discussed herein (see FIG. 8) start with inputting 801 an original image 802, such as an image in which differences are shown by changes in pixel brightness. The original data is divided or mapped into units of the landscape, in this case pixels. That is, one or more data values in the original data can correspond to one landscape unit. Each of the pixels or landscape units is assigned 803 a height value (and other parameters such as texture) based on the original pixels input values, such as brightness. The assigned values can then be modified 804 to provide additional information such as an alert for a condition detected in the original image data, such as a wave height above a threshold having it's pixels flash or to emboss part of the image. The data is then rendered 805 into a 3D image 806 using the height and other parameter values using conventional 3D imaging.

Figure 9:
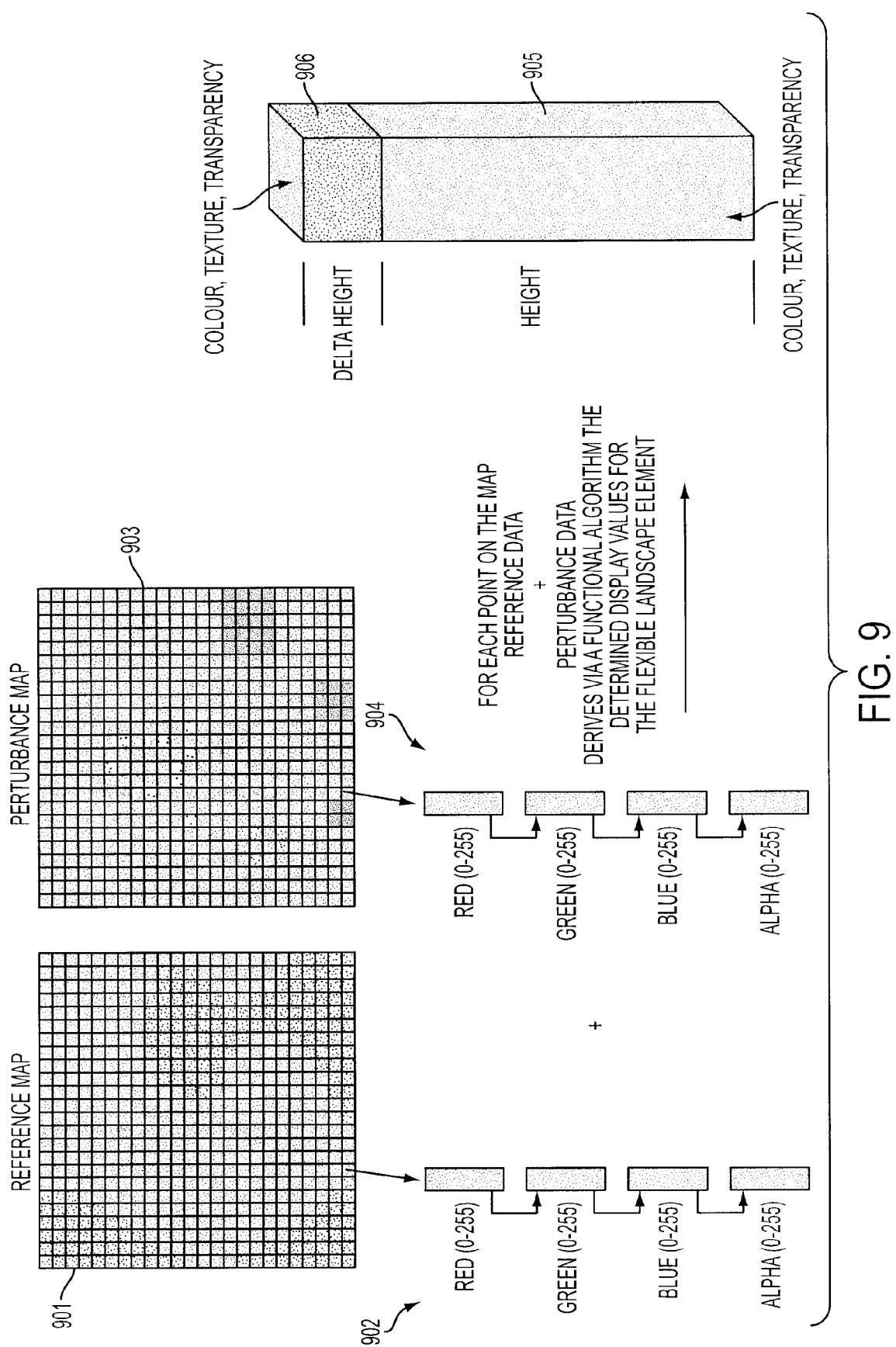
FIG. 9 depicts a typical input data structure.

An example of possible input data with an associated data structure is depicted in FIG. 9. The input can include an original reference map 901 of pixel values 902 that have various ranges. The input can also include one or more additional data maps, such as a perturbance map 903 that also has ranges 904. These different data sources can be combined into a height 905 and an offset 906 for each pixel.

Figure 10:
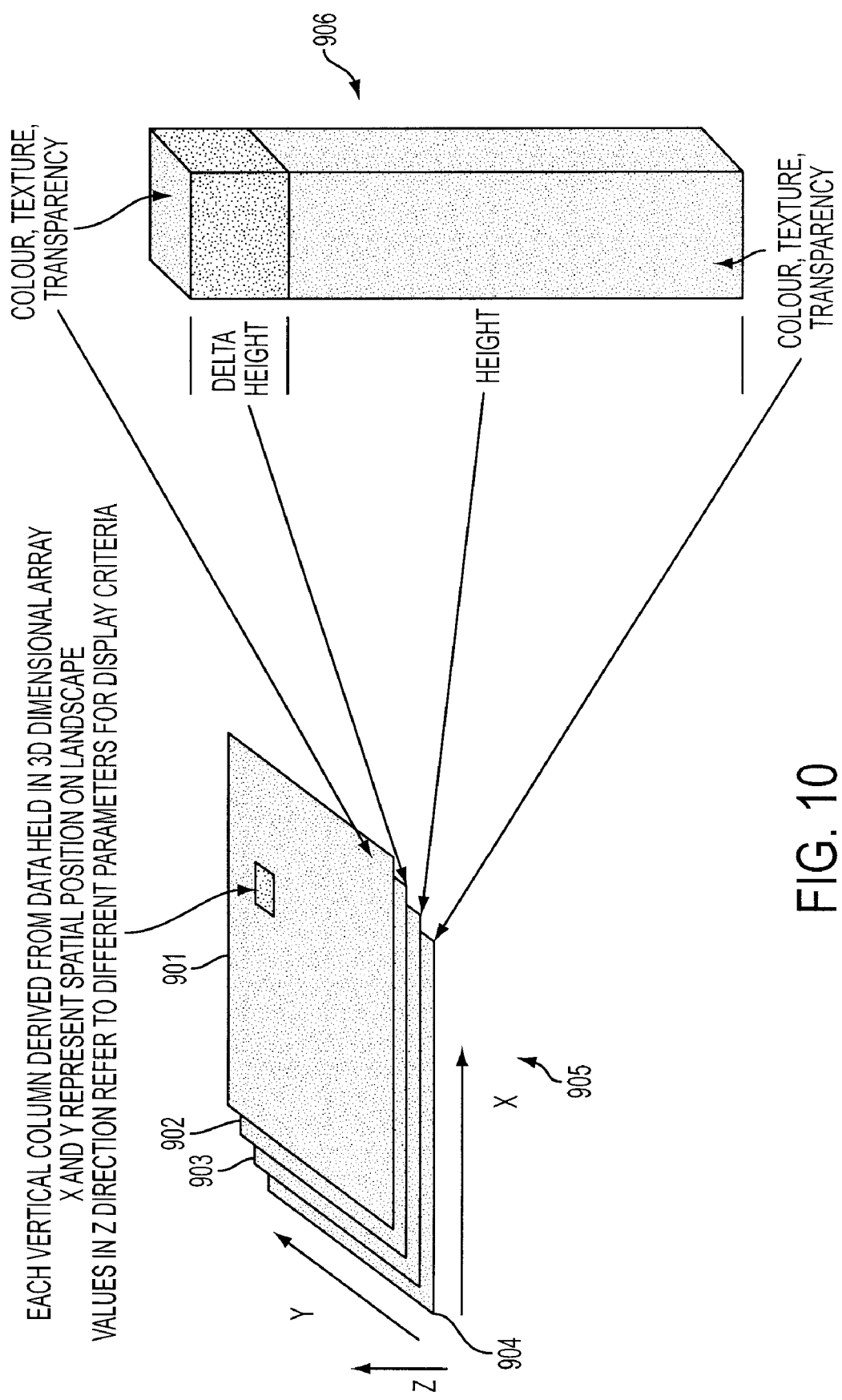
FIG. 10 depicts a typical output data structure.

FIG. 10 illustrates an example of a display or output data structure where the pixels of each of the layers 910-904 of an image 905 is represented by a different display parameter for the output pixels 906, including height, offset, color, transparency, texture, etc.

Figure 11:
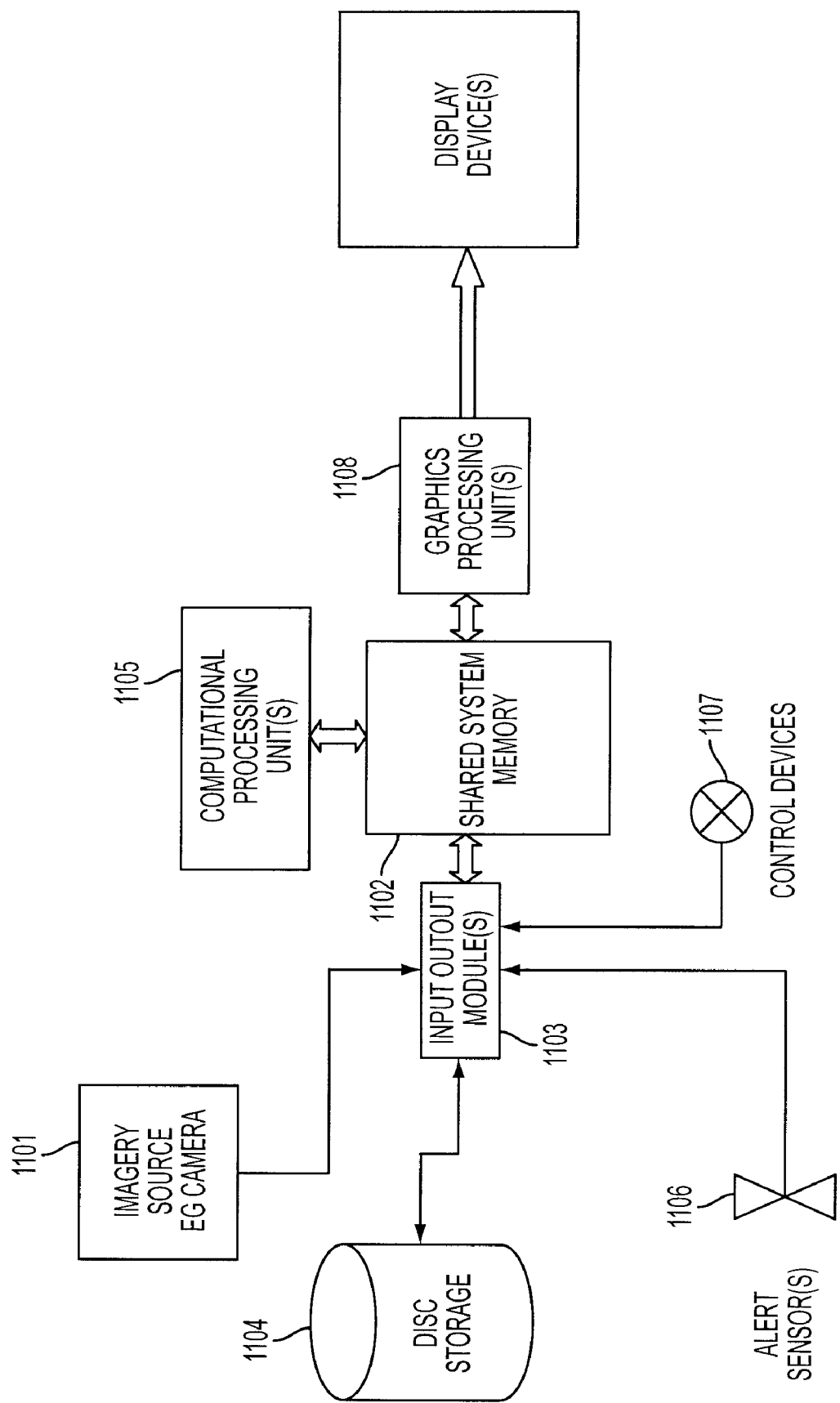
FIG. 11 shows typical hardware.

Typical hardware of the system includes an image source 1101 that supplies the image to a shared memory 1102 though an I/O unit 1103 as shown in FIG. 11. The image can be stored on disc storage 1104 as needed and is processed by computational units 1105, such as in a desk top or server machine, to add additional information such as alert information or an embossed portion. This information can be input by alert sensors 1106 and other control devices 1107, such as a mouse, keyboard, etc. The modified image data is processed by a graphics processing unit 1108 and output to a display 1109.

Figure 12:
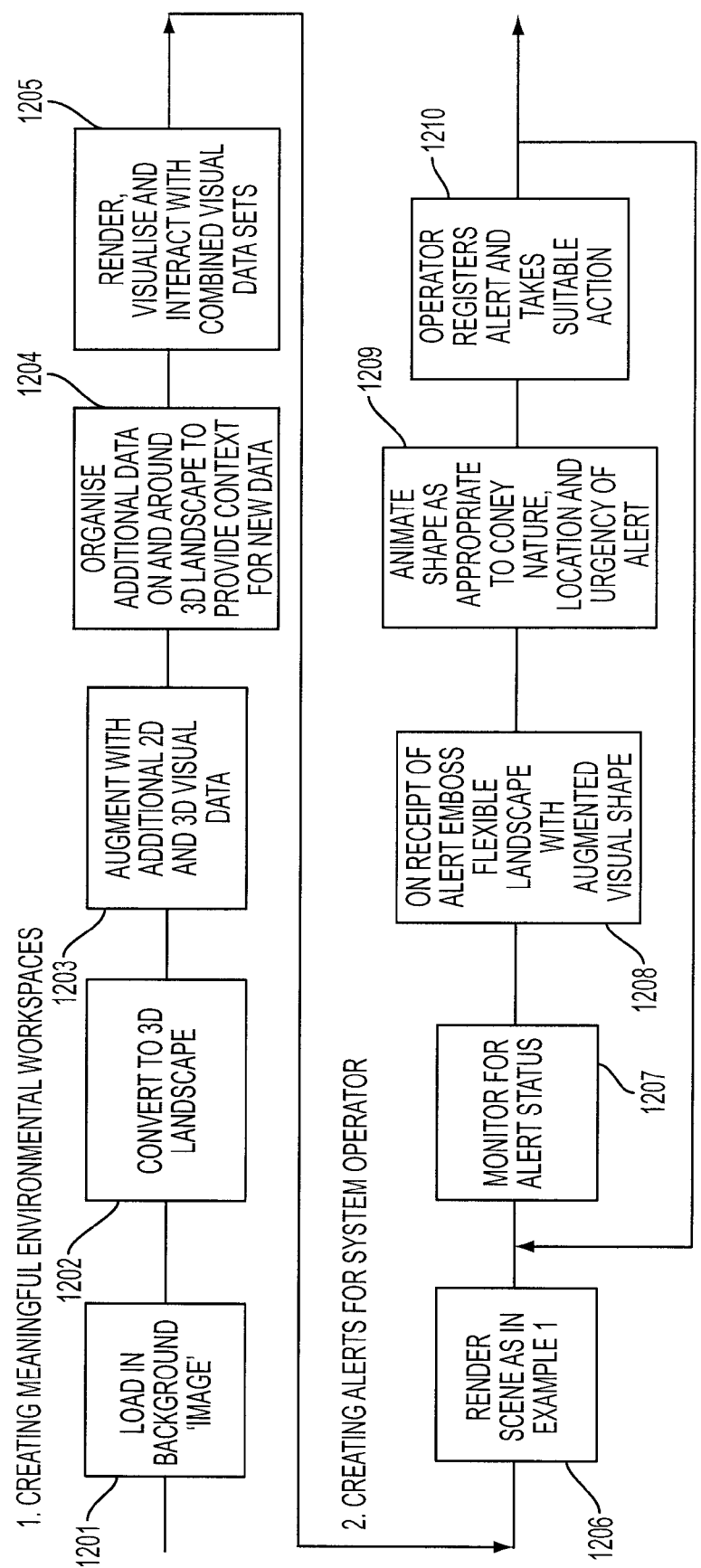
FIG. 12 illustrates how a user might use the system.

FIG. 12 illustrates a way in which a user might use the system. The background image is loaded 1201 and converted 1202 to a 3D landscape. The user can then add 1203 additional data to augment the 3D image. The additional data is organized 1204 as desired by the user and the combined image is rendered 1205. This image can then be presented to the users. If alerts are to be added to the landscape the rendered image 1206 is monitored 1207 for an alert condition. Upon receipt of the alert condition, the alert information, possibly an embossment, is added 1208 to the image data. When needed the added alert information can be animated 1209. The user who sees the alert augmented landscape image note the alert and takes appropriate action 1210.

The present invention has been described with respect to converting an entire data set, such as an entire image, into a landscape however, it is possible to convert only part of a data set into a landscape. In addition an image may be processed, modified or combined with other image feeds to create the final result. Thus landscape may represent the combination of a number of image inputs. The landscape may also be used to connect to a number of non-image based sensors, but have the resultant landscape represent the values of those sensors.

The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A method, comprising:
   receiving flat dimensional data comprising discrete elements;
   mapping the discrete elements to column heights of corresponding columns in a three-dimensional landscape comprising a plurality of columns;
   modifying the column heights by embossing additional three-dimensional information, wherein the embossing varies the column heights within an embossing site of the three-dimensional landscape based on the three-dimensional information, thereby augmenting the three-dimensional landscape with a visual representation of the additional three-dimensional information; and
   displaying an image of the three-dimensional landscape including the embossing site on a display.

2. The method as recited in claim 1, wherein the additional three-dimensional information comprises alert information.

3. The method as recited in claim 1, wherein the additional three-dimensional information comprises an animated dynamic element.

4. The method as recited in claim 1, wherein the flat dimensional data is an image and the discrete element corresponds to a pixel of the image, further comprising:
   assigning the pixel of the image a height value responsive to corresponding first data values in the flat data; and
   rendering the pixels with the height value as the three-dimensional landscape.

5. The method as recited in claim 1, further comprising:
   modifying additional parameters of the columns corresponding to other values of the discrete element.

6. The method as recited in claim 5, wherein the additional parameters are selected from a group of parameters comprising pixel offset, color, texture, and transparency.

7. The method as recited in claim 1, wherein the mapping comprises:
   mapping the flat dimensional data to discrete elements; and
   assigning corresponding columns to the discrete elements.

8. The method as recited in claim 7, wherein the columns have a shape comprising one of polygonal, curved, and irregular.

9. The method as recited in claim 1, wherein the displaying comprises:
   dividing the flat dimensional data with a grid;
   mapping the discrete elements at the grid locations to height values at corresponding column locations; and
   rendering the three-dimensional landscape for display on the display using the height values.

10. A method, comprising:
    receiving flat dimensional data;
    dividing the flat dimensional data with a grid;
    mapping the discrete elements at grid locations to height values at corresponding landscape image pixel locations;
    rendering landscape pixels at the locations into a three-dimensional landscape image comprising columns corresponding to the landscape pixels having heights corresponding to the height values;
    assigning additional parameters to the pixels selected from a group of parameters comprising pixel offset, color, texture, and transparency responsive to non-image characteristics;
    modifying the heights of the columns by embossing additional three-dimensional information, wherein the embossing varies the heights of the columns within an embossing site of the three-dimensional landscape based on the three-dimensional information, thereby augmenting the three-dimensional landscape with a visual representation of the additional three-dimensional information; and
    displaying an image of the three-dimensional landscape including the embossing site on a display.

11. A system, comprising:
    one or more processors configured to:
      receive flat dimensional data comprising discrete elements,
      to map the discrete element to column heights of corresponding columns in a three-dimensional landscape comprising a plurality of columns,
      to modify the column heights by embossing additional three-dimensional information to vary the column heights within an embossing site of the three-dimensional landscape based on the three-dimensional information, thereby augmenting the three-dimensional landscape with a visual representation of the additional three-dimensional information, and
      to render a three-dimensional landscape image from the three-dimensional landscape including the embossing site; and
    a display configured to display the image.

12. The system as recited in claim 11, further comprising an input device configured to supply augmenting data and the one or more processors configured to three-dimensionally augment the landscape image with the augmenting data by modifying the height of one or more columns of the plurality of columns based on values of the augmenting data.

13. A tangible computer-readable medium having stored thereon computer-executable instructions that, if executed by a computing device, cause the computing device to perform a method comprising:

receiving flat dimensional data comprising discrete elements;

mapping the discrete element to column heights of corresponding columns in a three-dimensional landscape comprising a plurality of columns;

modifying the column heights by embossing additional three-dimensional information, wherein the embossing varies the column heights within an embossing site of the three-dimensional landscape based on the three dimensional information, thereby augmenting the three-dimensional landscape with a visual representation of the additional three-dimensional information; and displaying an image of the three-dimensional landscape including the embossing site.

* * * * *